(12) United States Patent
Rasmussen

(10) Patent No.: US 7,236,671 B2
(45) Date of Patent: Jun. 26, 2007

(54) FIBER BUNDLES AND METHODS OF MAKING FIBER BUNDLES

(75) Inventor: Michael Heath Rasmussen, Keller, TX (US)

(73) Assignee: Corning Incorporated, Corning, NY (US)

( * ) Notice: Subject to any disclaimer, the term of this patent is extended or adjusted under 35 U.S.C. 154(b) by 183 days.

(21) Appl. No.: 11/126,778

(22) Filed: May 10, 2005

(65) Prior Publication Data

US 2006/0257083 A1 Nov. 16, 2006

(51) Int. Cl.
G02B 6/04 (2006.01)
G02B 6/02 (2006.01)

(52) U.S. Cl. .................................. 385/115; 385/126

(58) Field of Classification Search .................. None
See application file for complete search history.

(56) References Cited

U.S. PATENT DOCUMENTS

| | | | |
|---|---|---|---|
| 4,902,324 A | 2/1990 | Miller et al. | 65/407 |
| 5,011,251 A | 4/1991 | Miller et al. | 385/43 |
| 5,017,206 A | 5/1991 | Miller et al. | 65/406 |
| 5,251,276 A | 10/1993 | Berkey et al. | 385/43 |
| 5,295,205 A | 3/1994 | Miller et al. | 385/1 |
| 5,339,372 A | 8/1994 | Miller et al. | 385/29 |
| 5,351,326 A | 9/1994 | Miller et al. | 385/43 |
| 5,864,644 A | 1/1999 | DiGiovanni et al. | 385/43 |
| 5,881,189 A | 3/1999 | Carberry et al. | 385/39 |
| 5,889,908 A | 3/1999 | Miller et al. | 385/46 |
| 5,956,443 A | 9/1999 | Carberry et al. | 385/43 |
| 6,009,692 A | 1/2000 | Cullen et al. | 53/570 |
| 6,092,394 A | 7/2000 | Backer et al. | 65/377 |
| 6,243,522 B1 | 6/2001 | Allan et al. | 385/123 |
| 6,260,388 B1 | 7/2001 | Borrelli et al. | 65/393 |
| 6,444,133 B1 | 9/2002 | Fajardo et al. | 216/24 |
| 6,445,862 B1 | 9/2002 | Fajardo et al. | 385/125 |
| 6,468,374 B1 | 10/2002 | Kar et al. | |
| 6,847,771 B2 | 1/2005 | Fajardo et al. | 385/125 |
| 2005/0084222 A1* | 4/2005 | Kliner et al. | 385/115 |
| 2005/0220432 A1* | 10/2005 | Lee et al. | 385/126 |
| 2005/0232561 A1* | 10/2005 | Murofushi et al. | 385/125 |
| 2006/0153512 A1* | 7/2006 | Falkenstein et al. | 385/125 |

* cited by examiner

Primary Examiner—Tina M. Wong
(74) Attorney, Agent, or Firm—Timothy M. Schaeberle

(57) ABSTRACT

The present invention relates to fiber bundles and methods for making fiber bundles. According to one embodiment of the invention, a fused fiber bundle has a terminal section ending with an endface, and includes a plurality of optical fibers, each of the optical fibers having a terminal segment ending with a proximal end, and a distal end; and a cellular holding structure, the cellular holding structure including a cellular web portion having a plurality of longitudinal cells arranged substantially in parallel and surrounded by a web material; and a tube portion surrounding the cellular web portion. The terminal segments of the optical fibers are arranged substantially in parallel, and the terminal segment of each optical fiber is disposed in a longitudinal cell of the cellular holding structure and substantially fused to the web material, thereby forming the terminal section of the fused fiber bundle.

22 Claims, 10 Drawing Sheets

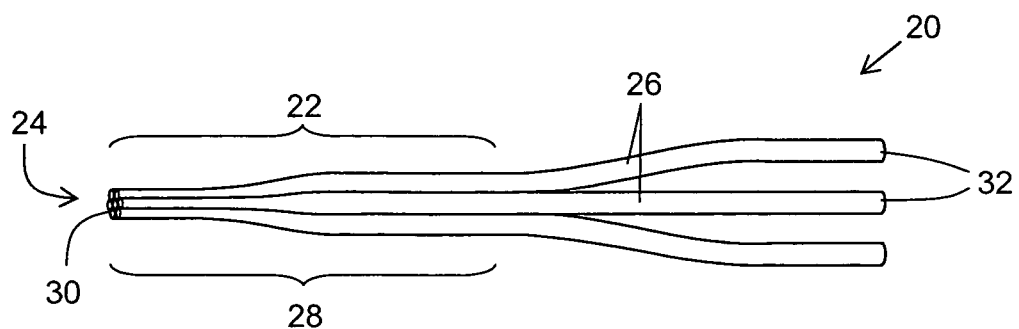
FIG. 1 – PRIOR ART
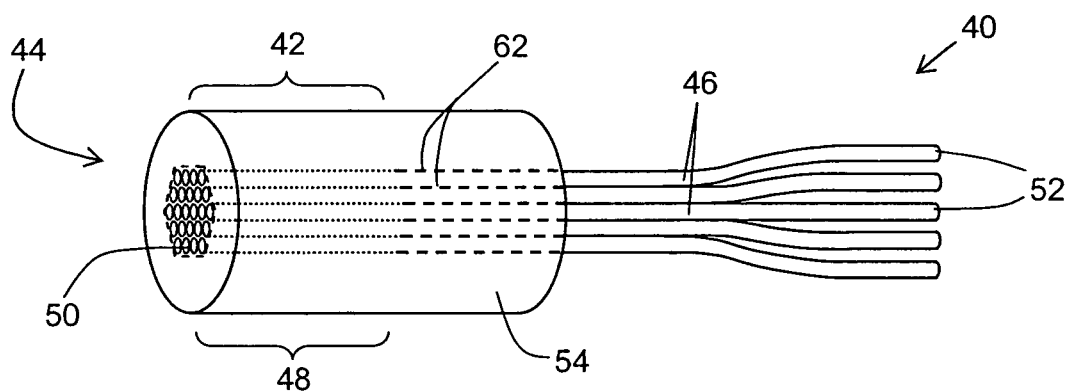
FIG. 2
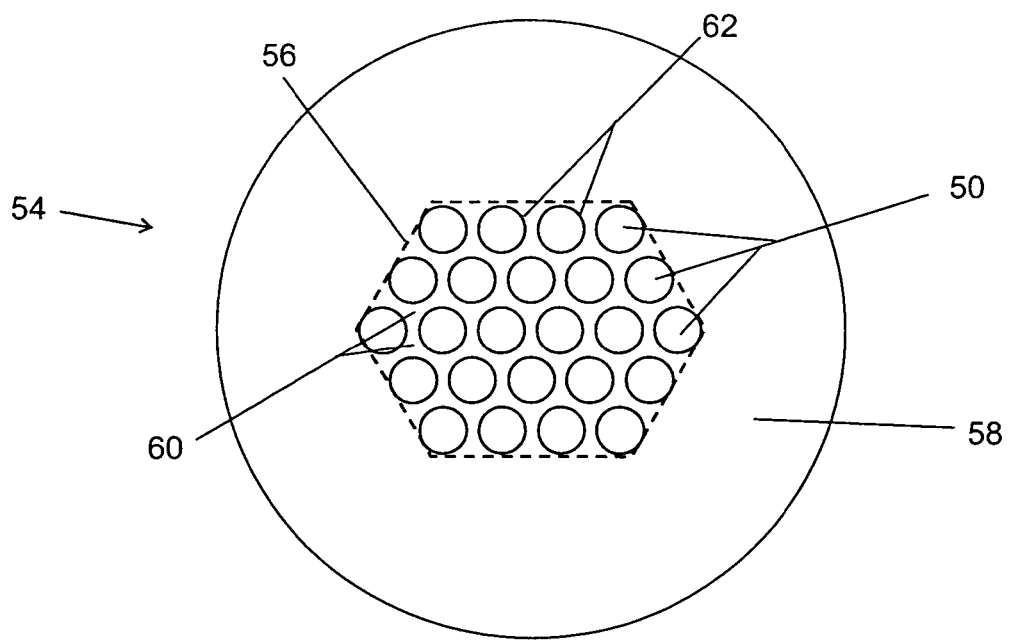
FIG. 3

FIBER BUNDLES AND METHODS OF MAKING FIBER BUNDLES

BACKGROUND OF THE INVENTION

1. Field of the Invention

The present invention relates generally to devices for transporting light. More specifically, the invention relates to fiber bundles and methods for making fiber bundles.

2. Technical Background

In the fields of optical communication, laser machining, and optical sensing, it is often desirable to combine optical power from several sources into a single beam. For example, in sensing applications, a fiber bundle can be used to combine optical power of different wavelengths from different laser or lamp sources into a single beam. In certain high-power applications, a fiber bundle can combine optical power from several identical sources into a single beam of relatively high power. Fiber bundles may also be used to divide light from a single source into a plurality of beams, or to reshape a beam in order to couple it between different optical devices.

A conventional fiber bundle is shown in FIG. 1. Fiber bundle 20 has a terminal section 22, and an endface 24. Fiber bundle 20 includes a plurality of optical fibers 26, each of which has a terminal segment 28 ending with a proximal end 30, and a distal end 32. The terminal segments 28 of optical fibers 26 are arranged substantially in parallel, and are affixed to one another (e.g., with adhesive or by fusion) to form the terminal section 22 of fiber bundle 20. The proximal ends 30 of optical fibers 26 are presented at the endface 24 of fiber bundle 20. In order to reduce the size of the beam, it may be desirable to taper the terminal section of the fiber bundle, as shown in FIG. 1.

However, conventional fiber bundles have certain disadvantages. For example, especially in tapered fiber bundles, the terminal section of the fiber bundle is often very small and very fragile, making it difficult to handle and prone to breakage. Further, the outermost fibers of a conventional fiber bundle can separate from the interior fibers, causing both a physical fraying of the fiber bundle, and a corresponding fraying of the optical beam. Since it is difficult to remove airspace between fibers at the endface of the fiber bundle, polishing and AR coating of the endface can be complicated by the presence of particulate matter in any airspace. It is also difficult to precisely position with respect to one another the optical fibers of a conventional fiber bundle.

SUMMARY OF THE INVENTION

One embodiment of the present invention relates to a fused fiber bundle having a terminal section ending with an endface, the fused fiber bundle including a plurality of optical fibers, each of the optical fibers having a terminal segment ending with a proximal end, and a distal end; and a cellular holding structure, the cellular holding structure including a cellular web portion having a plurality of longitudinal cells arranged substantially in parallel and surrounded by a web material; and a tube portion surrounding the cellular web portion; wherein the terminal segments of the optical fibers are arranged substantially in parallel, and wherein the terminal segment of each optical fiber is disposed in a longitudinal cell of the cellular holding structure and substantially fused to the web material, thereby forming the terminal section of the fused fiber bundle.

Another embodiment of the present invention relates to a method of making a fused fiber bundle including the steps of providing a plurality of optical fibers, each of the optical fibers having a fusible segment and a distal end; optionally providing at least one spacing member; providing a cellular holding structure, the cellular holding structure having a cellular web portion having a plurality of longitudinal cells arranged in parallel and surrounded by web material; and a tube portion surrounding the cellular web portion; inserting the fusible segments of the optical fibers and the optional at least one spacing member into the longitudinal cells of the cellular holding structure in a substantially parallel arrangement; heating the cellular holding structure in the region surrounding the fusible segments of the optical fibers, so that the optical fibers substantially fuse to the web material of the cellular holding structure, thereby forming a fused region; and cutting the fused region to expose an endface, thereby forming the fused fiber bundle.

Another embodiment of the present invention relates to an optical fiber coupler having a fused, tapered section, the optical fiber coupler comprising a plurality of optical fibers, each optical fiber having a fused segment and at least one distal end; a cellular holding structure, the cellular holding structure having a cellular web portion having a plurality of longitudinal cells arranged in parallel and surrounded by web material; and a tube portion surrounding the cellular web portion; wherein the fused segments of the optical fibers are disposed within the longitudinal cells of the cellular holding structure in the fused, tapered section; and wherein in the fused, tapered section of the optical fiber coupler, the fused segment of each optical fiber is fused to the web material and is optically coupled to at least one other optical fiber.

The devices and methods of the present invention result in a number of advantages over prior art devices and methods. For example, the fiber bundles of the present invention can be made to be durable and handleable, and easily fixtured in a device. Embodiments of the present invention made with a cellular holding structure having a lower index tube portion can provide an output beam having a desired numerical aperture. The methods of the present invention allow the skilled artisan to construct fiber bundles having a large number of optical fibers in a desired, well-controlled geometrical arrangement, and having little void space among the optical fibers at the enface of the bundle.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. For example, for the sake of clarity, not all distal ends of the optical fibers are shown in the drawings. The drawings illustrate one or more embodiment(s) of the invention, and together with the description serve to explain the principles and operation of the invention.

BRIEF DESCRIPTION OF THE DRAWINGS

FIG. 1 is a schematic view of a conventional fiber bundle;

FIG. 2 is a schematic side view of a fused fiber bundle according to an embodiment of the present invention;

FIG. 3 is a schematic end-on view of a fused fiber bundle according to the embodiment of FIG. 2;

DETAILED DESCRIPTION OF THE INVENTION

Figure 4:
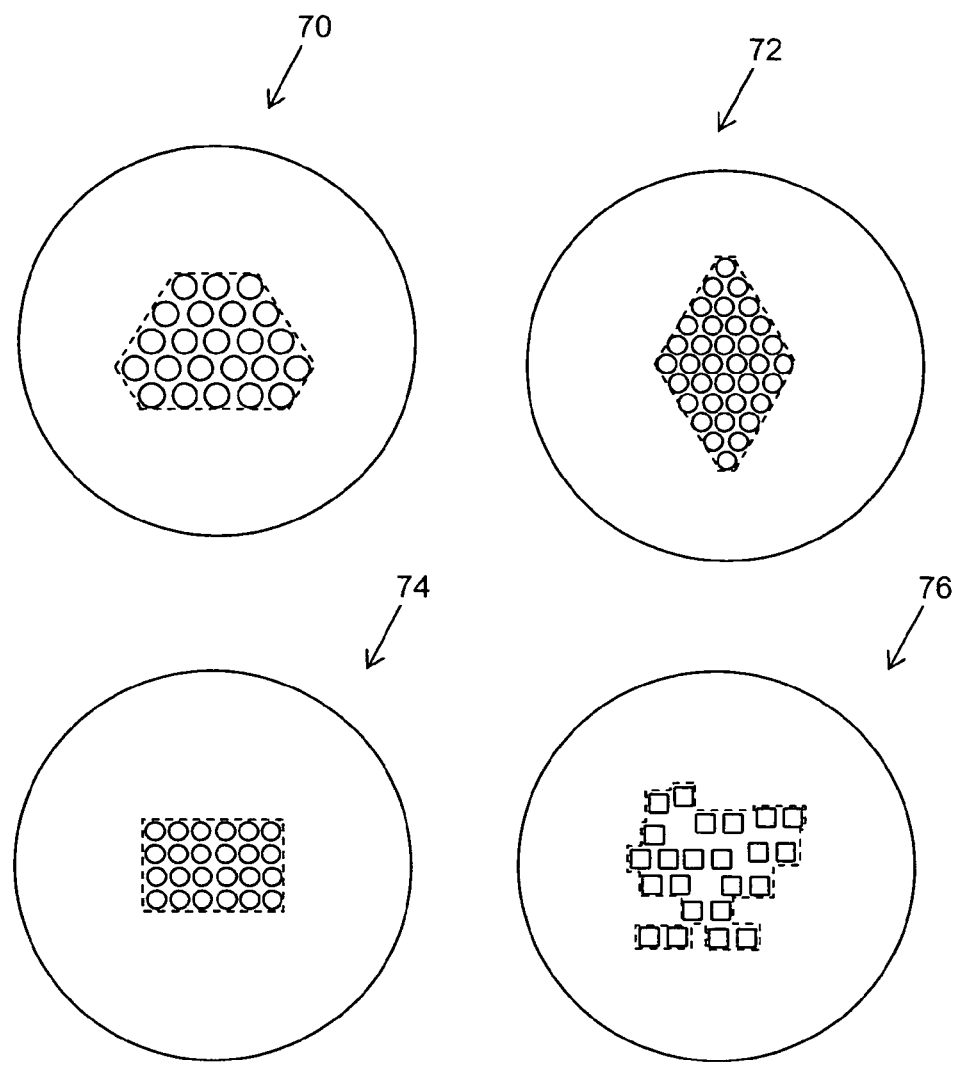
FIG. 4 is a set of cross-sectional views of a few examples of fused fiber bundles according to an embodiment of the present invention.

An example of a fused fiber bundle according to one embodiment of the present invention is shown in schematic side view in FIG. 2, and in end-on schematic view in FIG. 3. Fused fiber bundle 40 has a terminal section 42, ending with an endface 44. Fused fiber bundle 40 includes a plurality of optical fibers 46, each of which has a terminal segment 48 ending with a proximal end 50, and a distal end 52. Fused fiber bundle 40 also includes a cellular holding structure 54, which includes a cellular web portion 56 and a tube portion 58 surrounding the cellular web portion 56. The cellular web portion 56 is formed from a web material 60, and includes a plurality of longitudinal cells 62 arranged substantially in parallel, each surrounded by the web material 60. The terminal segments 48 of optical fibers 46 are arranged substantially in parallel, and each terminal segment 48 is disposed in a longitudinal cell 62 of the cellular holding structure 54. The terminal segments 48 of optical fibers 46 are substantially fused to the web material 60 of the cellular holding structure 54 to form the terminal section 42 of fused fiber bundle 40. FIG. 3 is an end-on schematic view of the endface 44, more clearly depicting the proximal ends 50 of the optical fibers 46, and the cellular web portion 56 (formed from web material 60) and the tube portion 58 of the cellular holding structure 54. The proximal ends 50 of optical fibers 46 are presented at the endface 44 of fused fiber bundle 40, so that optical power may be coupled into or out of them.

The fused fiber bundle may be constructed, for example, by inserting optical fibers into a preformed cellular holding structure followed by fusion (using heat) to form the bundle, as described in greater detail hereinbelow. Use of a preformed cellular holding structure allows the skilled artisan to more easily align the optical fibers with respect to one another in a desired arrangement, and can simplify automation of the fiber placement process. As will be described in more detail below, the use of a cellular holding structure can also allow the skilled artisan to more freely design bundles having desired fiber geometries and lattice types, without being constrained by the cross-sectional shapes of the optical fibers themselves.

According to one embodiment of the invention, the ratio of the cross-sectional area of the whole endface to the cross-sectional area of the cellular web portion of the cellular holding structure is at least about 2.5. Desirably, the ratio of the cross-sectional area of the whole endface to the cross-sectional area of the cellular web portion of the cellular holding structure is at least about 4. More desirably, the ratio of the cross-sectional area of the whole endface to the cross-sectional area of the cellular web portion of the cellular holding structure is at least about 7. In certain especially desirable embodiments of the invention, the ratio of the cross-sectional area of the whole endface of the cellular web portion of the cellular holding structure is at least about 10, at least about 15, or even at least about 20. For purposes of calculating this ratio, the cross-sectional area of the cellular web portion includes the cells into which the optical fibers are inserted. For example, in the embodiment of the invention shown in FIG. 3, the cross-sectional area of the cellular web portion 56 includes the entire outlined hexagon. The skilled artisan will appreciate that while the outlines of the proximal ends of the individual optical fibers and the cellular web portion and tube portion of the cellular holding structure may not be visible at the endface of the fused fiber bundle, the ratio of cross-sectional areas can be determined using, for example, the cross-sectional areas of the tube portion, the cellular web portion, and the terminal segments of the optical fibers before fusion, and correcting for any distortion that occurs during fusion. Fused fiber bundles having relatively large cross-sectional ratios can be easier to handle and fixture in optical devices.

The fused fiber bundles of the present invention can be made with a variety of numbers of optical fibers arranged in a variety of ways. The methods according to certain embodiments of the present invention, described below, use a preformed cellular holding structure having a well-defined cell geometry and lattice type to allow relatively large numbers of optical fibers to be arranged in a fused fiber bundle having a tightly-controlled geometry (i.e., the overall shape of the grouping of optical fibers) and lattice type (i.e., the spatial relationship of neighboring optical fibers). For example, the fused fiber bundles of the present invention can be formed from at least 4 optical fibers. In certain desirable embodiments of the invention, the fused fiber bundle includes at least 10 optical fibers. In other desirable embodiments of the invention, the fused fiber bundle includes at least 15 optical fibers. The optical fibers can be arranged, for example, in a triangular lattice or a square lattice. The skilled artisan will appreciate that the methods of the present invention enable the formation of fused fiber bundles having a wide variety of regular and irregular geometries. For example, the optical fibers can be arranged in geometries such as diamond-shaped, triangular, hexagonal, trapezoidal and rectangular. Examples of fused fiber bundles according to the present invention are shown in cross-sectional view in FIG. 4. For example, fused fiber bundle 70 has 23 optical fibers arranged in a triangular lattice in an irregular hexagonal geometry, and fused fiber bundle 72 has 36 optical fibers arranged in a triangular lattice in a diamond-shaped geometry. Because the lattice type is defined by the cellular holding structure, the optical fibers need not be arranged in a lattice type that allows them to be close-packed. For example, in fused fiber bundle 74, optical fibers having circular cross section are arranged in a square lattice, and not the triangular lattice that would be required by close-packing. The optical fibers need not be cylindrical in shape; rather, they can have any shape, e.g., rectangular, square, or D-shaped. Further, the geometry and lattice type of the fiber arrangement need not have any particular regularity or symmetry. For example, fused fiber bundle 76 has 22 square cross-section optical fibers arranged in an irregular geometry and lattice type.

The fused fiber bundles of the present invention desirably have substantially no organic material (e.g., adhesive) between the optical fibers and the web material. Instead, the optical fibers are desirably fused to the web material by heating them and allowing their glassy outer surfaces to intermingle. The absence of organic material can increase durability, can allow the fused fiber bundles of the present invention to handle high optical powers without concern for the stability of the adhesive, and can simplify polishing and tapering operations, such as those described hereinbelow.

Figure 5:
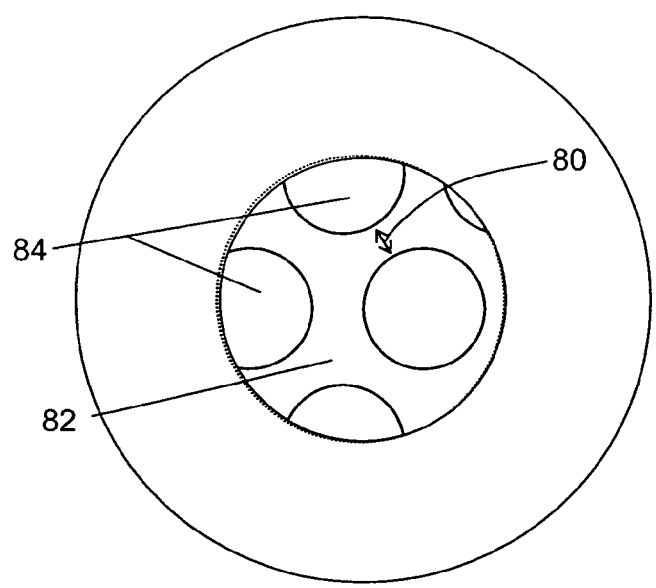
FIG. 5 is an magnified cross-sectional view of a fused fiber bundle according to the present invention, showing a minimum thickness of a web material.

In certain desirable embodiments of the invention, the cellular holding structure is formed with relatively thin walls of web material between adjacent cells. For example, the minimum thickness of the web material is desirably less than about 100 μm in the fused fiber bundles according to certain embodiments of the invention. As shown in schematic cross-sectional view in FIG. 5, the minimum thickness 80 of the web material 82 is defined as the closest approach of two optical fibers 84 held in adjacent cells of the cellular holding structure. In other embodiments of the invention, the minimum thickness of the web material is less than about 25 μm, or even less than about 10 μm. In certain especially desirable embodiments of the application, the minimum thickness of the web material is less than about 5 μm. The skilled artisan can form cellular holding structures having relatively thin web material using the methods described hereinbelow. Fused fiber bundles having relatively thin web material between adjacent optical fibers can transmit light with high power densities, and may be desirable for certain applications.

The fused fiber bundles of the present invention are desirably collapsed, so that substantially no airspace remains in the terminal section of the fused fiber bundle. A collapsed fused fiber bundle will have substantially no airspace remaining between the terminal segments of the optical fibers and the web material of the cellular holding structure. Methods to collapse the fused fiber bundles of the present invention are described below. A collapsed fused fiber bundle can be advantageous, as there exists substantially no airspace between optical fibers in which particulate matter can become lodged during polishing and processing operations. Collapsed fused fiber bundles can therefore be much easier to successfully AR coat than are conventional fiber bundles. Methods for fully collapsing fused fiber bundles are described in more detail below.

Figure 6:
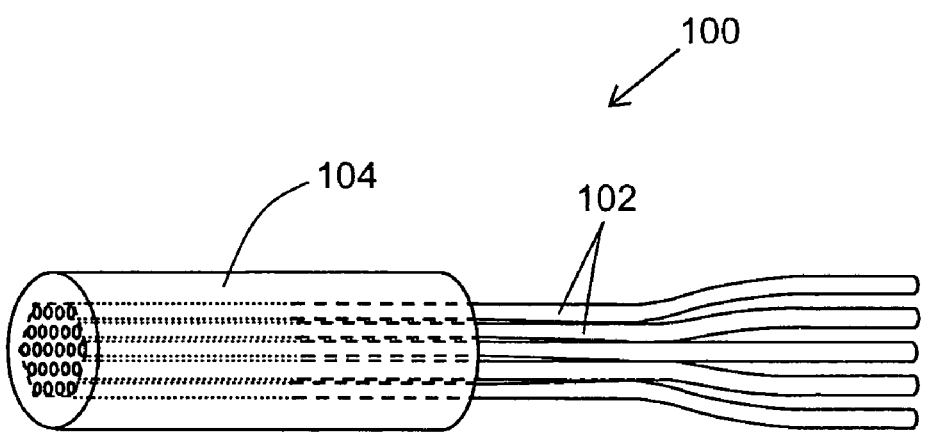
FIG. 6 is a schematic side view of a fused fiber bundle according to another embodiment of the present invention.
Figure 7:
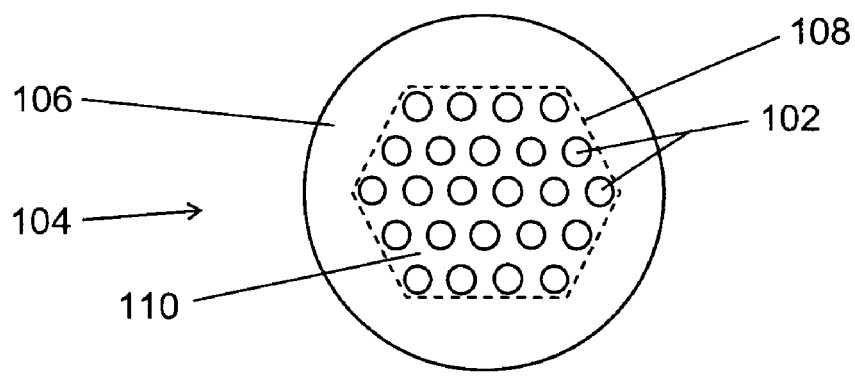
FIG. 7 is a schematic end-on view of a fused fiber bundle according to the embodiment of FIG. 6.

Another embodiment of the present invention is shown in schematic side view in FIG. 6 and in end-on schematic view in FIG. 7. In this embodiment of the invention, fused fiber bundle 100 is constructed from a plurality of optical fibers 102 (each inherently having a core and a cladding) and a cellular holding structure 104 having a tube portion 106 and a cellular web portion 108 formed from a web material 110. Desirably, the tube portion 106 of the cellular holding structure 104 has a refractive index that is less than the refractive index of the claddings of the optical fibers 102. For example, the difference between the refractive index of the claddings of the optical fibers and the refractive index of the tube portion may be at least 0.005. Desirably, the difference between the refractive index of the claddings of the optical fibers and the refractive index of the tube portion is at least 0.01. In certain desirable embodiments of the invention, the difference between the refractive index of the claddings of the optical fibers and the refractive index of the tube portion is at least 0.02. Similarly, in desirable embodiments of the invention, the refractive index of the web material 110 of the cellular web portion 108 of cellular holding structure 104 is less than the refractive index of the claddings of the optical fibers 102. For example, the difference between the refractive index of the claddings of the optical fibers and the refractive index of the web material may be at least 0.005. Desirably, the difference between the refractive index of the claddings of the optical fibers and the refractive index of the web material is at least 0.01. In certain desirable embodiments of the invention, the difference between the refractive index of the claddings of the optical fibers and the refractive index of the web material is at least 0.02. As the skilled artisan will appreciate, both of the web material and the tube portion may have refractive indices lower than that of the claddings of the optical fibers. A lower index tube portion and/or web material surrounding the optical fibers may be advantageous, in that it can help provide enhanced light-guiding properties to the terminal section of the fused fiber bundle, and can be used to tailor the numerical aperture of the beam of optical energy emitted during operation by the endface of the fused fiber bundle. A lower index tube portion may be especially advantageous in the tapered fused fiber bundles described hereinbelow, because it can account for the fact that the tapering process tends to lower the index contrast of the individual optical fibers, thereby causing a diminution in their guiding properties.

In order to improve the quality of the endface polishing process to provide mechanical stability and reliability and to minimize polarization effects, it may be desirable for the web material of the cellular web portion of the cellular holding structure to have substantially the same coefficient of thermal expansion as the claddings of the optical fibers. For example, it may be desirable for the coefficient of thermal expansions of the claddings and of the web material to be within about 30%, or even within about 10% of each other. Similarly, it may be desirable for the tube portion of the cellular holding structure to have substantially the same coefficient of thermal expansion as the claddings of the optical fibers. For example, it may be desirable for the coefficient of thermal expansions of the claddings and of the tube portion to be within about 30%, or even within about 10% of each other. Similarly, it may be desirable for the web material of the cellular web portion of the cellular holding structure to have a hardness similar to that of the claddings of the optical fibers. For example, it may be desirable for the hardnesses to be within 10% of one another.

In order to provide fused fiber bundles that suffer from a minimum of distortion of the optical fibers, it may be desirable for the softening point of the optical fibers to be higher than that of the materials of the cellular holding structure. For example, in one embodiment of the invention, the softening point of the web material is at least 50 K less than the softening point of the claddings of the optical fibers. Desirably, the softening point of the web material is at least 100 K less than the softening point of the claddings of the optical fibers. Similarly, in one embodiment of the invention, the softening point of the tube portion is at least 50 K less than the softening point of the claddings of the optical fibers. Desirably, the softening point of the tube portion is at least 100 K less than the softening point of the claddings of the optical fibers. During fusion, collapse, and any tapering operations, web materials and/or tube portions having lower softening points than the claddings of the optical fibers will deform more than the optical fibers, more readily filling any void space in the terminal section of the fused fiber bundle.

Figure 8:
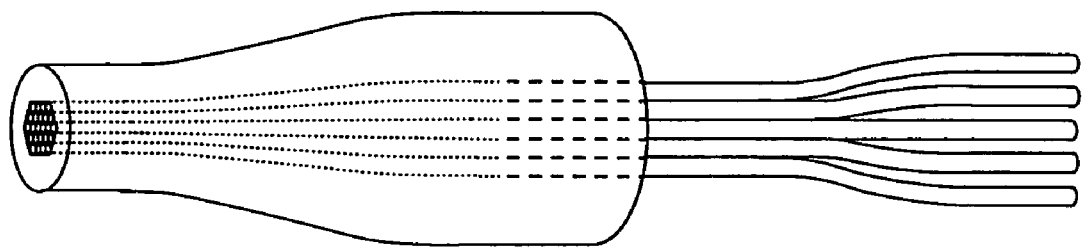
FIG. 8 is a schematic side view of a tapered fused fiber bundle according to an embodiment of the present invention.

In order to decrease the size of the beam of optical energy emitted during operation by the endface of the fused fiber bundle, it may be desirable for the fused fiber bundle to be tapered, as shown in schematic view in FIG. 8. Tapering can also increase the divergence of the emitted beam. The skilled artisan will use standard heating and drawing methods to provide the tapered fused fiber bundles of the present invention.

The fused fiber bundles of the present invention are desirably large enough in cross-section to be handleable and durable. For example, the terminal section of a fused fiber bundle of the present invention is desirably at least about 1 mm in diameter, or about 0.78 mm$^2$ in cross-sectional area. In certain desirable embodiments of the invention, the terminal section of a fused fiber bundle is at least about 2 mm in diameter or about 3.14 mm$^2$ in cross-sectional area. The skilled artisan will appreciate that for tapered fused fiber bundles, it will be necessary to use a glass tube having somewhat larger dimensions to provide a tapered section having a desirably large diameter or cross-sectional area.

The distal ends of the optical fibers can be adapted to be coupled to the desired sources of optical energy. For example, the distal ends of the optical fibers can be lensed, or can be fitted with GRIN collimators. Lensed fibers are available from Corning Incorporated of Corning, N.Y. Alternatively, the distal ends of the optical fibers can be pigtailed to the desired sources, or can be themselves formed into a fiber bundle. The skilled artisan will appreciate that the distal ends of the fibers can be individually adapted in different ways.

As the skilled artisan will appreciate, the fused fiber bundles of the present invention can be made with a variety of types of optical fibers. For example, the optical fibers can be single-mode or multi-mode, can be made of silica glass or of other types of glass, and can be of different types or the same type. The optical fibers can be of a standard size (e.g., about 125 μm in diameter), or can have reduced cladding thickness and smaller size (e.g., about 80 μm in diameter). Similarly, the optical fibers can have a non-standard core size (e.g., 105 μm core diameter, 125 μm fiber diameter). The tube portion and the web material of the cellular web portion of the cellular holding structure can be formed from any material, and are desirably selected to be compatible with the optical fibers (e.g. fusible, lower refractive index). Desirably, the materials of the cellular holding structure are similar in hardness (e.g., within 30%, or even within 10%) to the material of the optical fibers, in order to provide good polishing characteristics. Desirably, the tube portion and the web material of the cellular web portion of the cellular holding structure are made from substantially the same material as are the optical fibers (e.g., silica). As the skilled artisan will appreciate, the materials of the cellular holding structure may be differently-doped analogs of the materials of the optical fibers. For example, a cellular holding structure for use with silica-based optical fibers might be formed from boron- or phosphorus-doped silica glass, so that the web material and/or tube portion have desirable (e.g., lower) refractive indices and/or softening points relative to those of the claddings of the optical fibers.

Another embodiment of the present invention relates to a method of making a fused fiber bundle. The skilled artisan can adapt known techniques for making overclad couplers, such as those described in U.S. Pat. Nos. 4,902,324; 5,009,692; 5,011,251; 5,017,206; 5,251,276; 5,295,205; 5,339,372; 5,351,326; 5,881,189; 5,889,908; 5,956,443; and 6,092,394, each of which is hereby incorporated herein by reference in its entirety. An example of a method of making a fused fiber bundle according to the present invention is shown in schematic view in FIG. 9. A plurality of optical fibers 120, each having a fusible segment 122 and a distal end 126, is provided. Optionally, at least one spacing member 128 is provided. A cellular holding structure 130, having a tube portion 131 surrounding a cellular web portion 132, is also provided. The cellular web portion 132 has a plurality of longitudinal cells 133 arranged in parallel and surrounded by web material, as described above. The longitudinal cells 133 are each adapted to closely fit one or more of the plurality of optical fibers and/or the optional at least one spacing member. The cellular web portion 132 is adapted to provide the desired geometrical arrangement to the fusible segments 122 of the optical fibers 120, as well as to provide the desired spatial relationship between neighboring optical fibers.

To fabricate the fused fiber bundle from the provided parts, the fusible segments 122 of the optical fibers and the at least one optional spacing member 128 are inserted into the longitudinal cells 133 of the cellular web portion 132 of the cellular holding structure 130 in a substantially parallel arrangement. A lubricant (e. g., isopropanol) may be used to ease the insertion of the fibers into the cells of the cellular holding structure; any lubricant is desirably volatile and/or combustible enough to be evaporated and/or burned away during the fusion step. The cellular holding structure 130 is then heated in the region surrounding the inserted fusible segments 122, so that the fusible segment of each of the optical fibers is substantially fused to the web material, thereby forming fused section 134. The fused section 134 is then separated to expose an endface 136, thereby forming a fused fiber bundle 140 having a terminal section 142, and an endface 136. Fiber bundle 140 comprises the plurality of optical fibers 120, each of which has a terminal segment 148 ending with a proximal end 150, and the distal end 126. The terminal segments 148 of optical fibers 120 are arranged substantially in parallel, and are held in the cellular holding structure 130. The fusible segment 148 of each optical fiber 120 is substantially fused to the web material in the terminal section 142 of fused fiber bundle 140. The separation of the fused section 134 creates proximal ends 150 of optical fibers 120, which are presented at the endface 136 of fiber bundle 140, so that optical power may be coupled into them.

Figure 9:
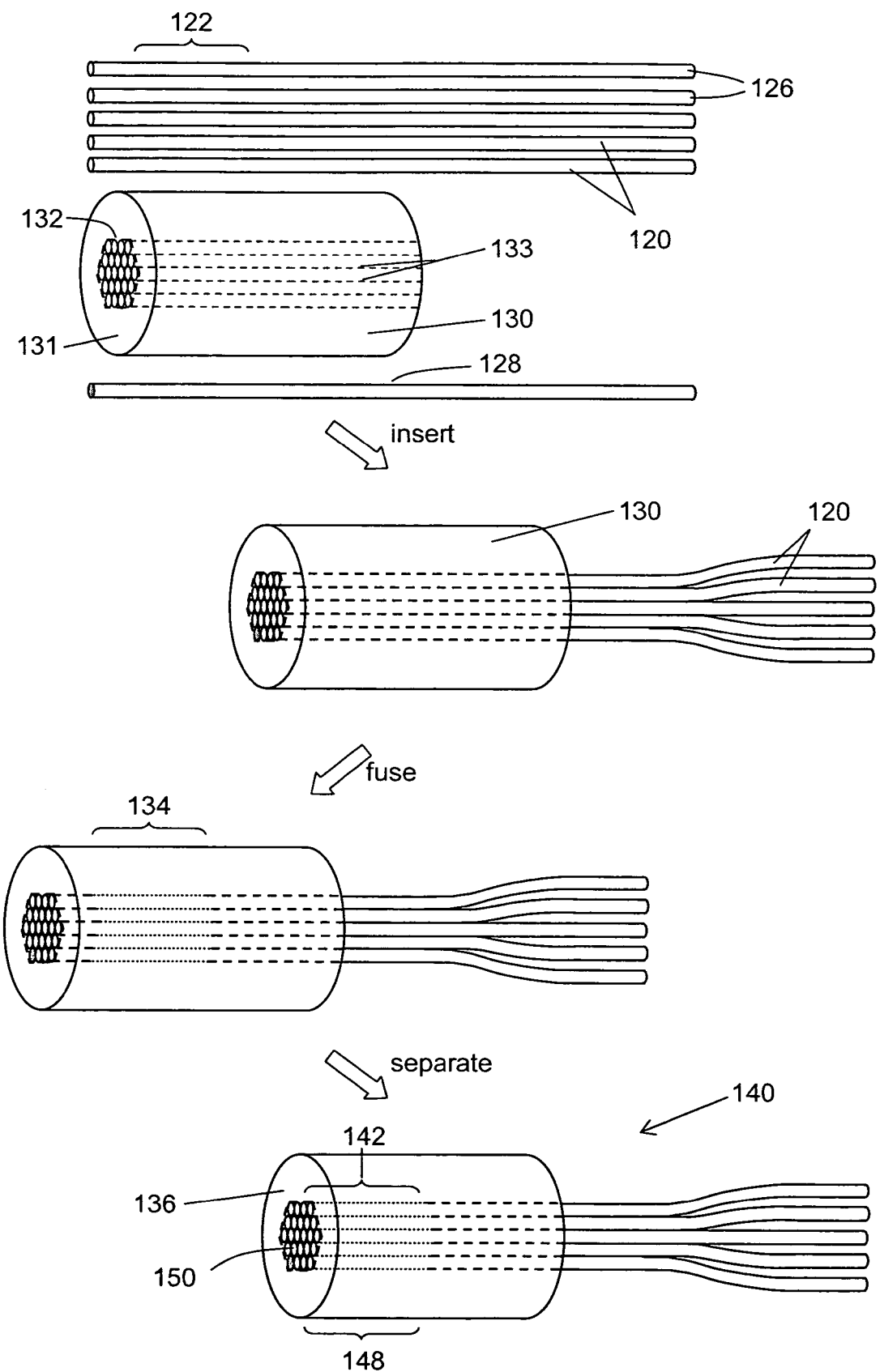
FIG. 9 is a schematic view of a method of making a fused fiber bundle according to an embodiment of the present invention.
Figure 10:
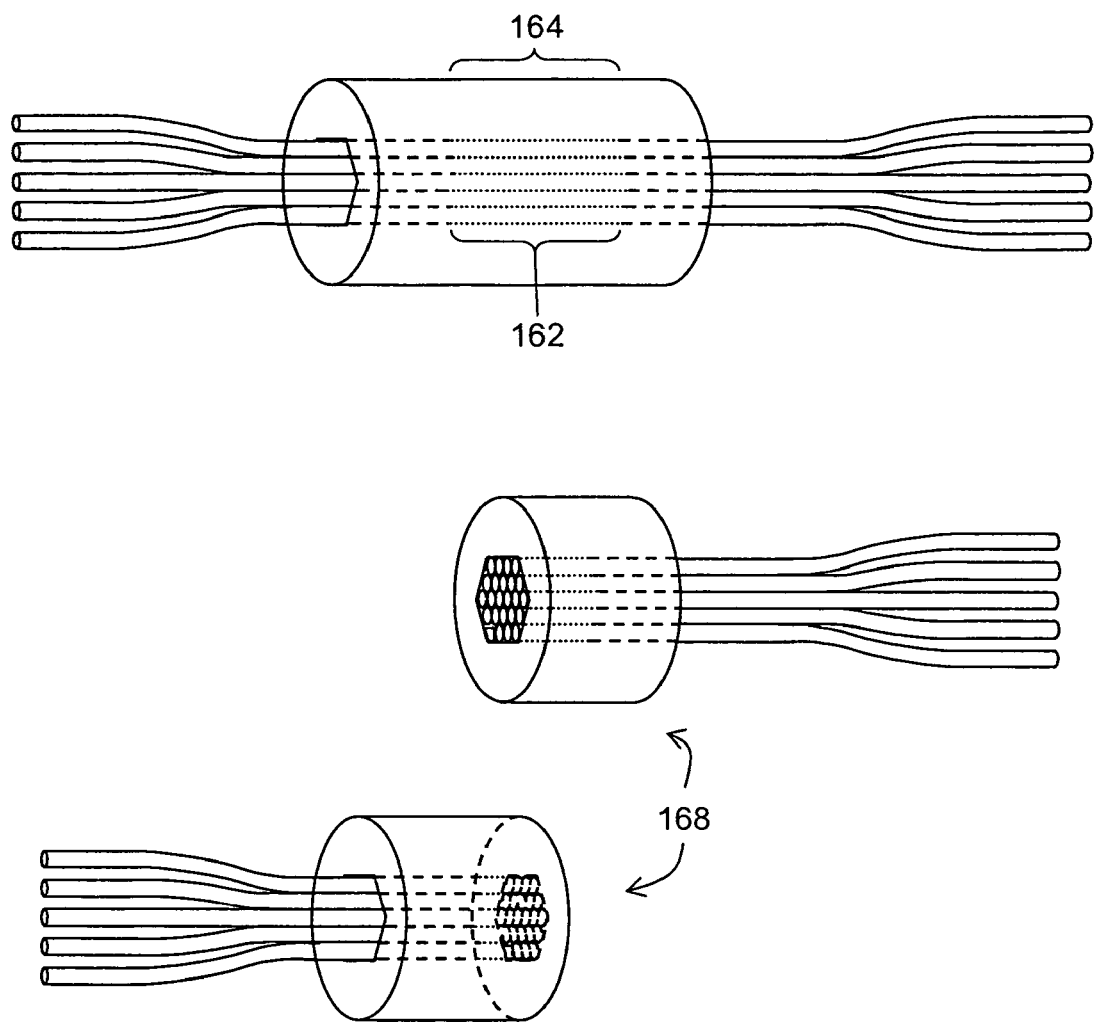
FIG. 10 is a schematic view of a method of making a fused fiber bundle using interior segments of optical fibers according to an embodiment of the present invention.
Figure 11:
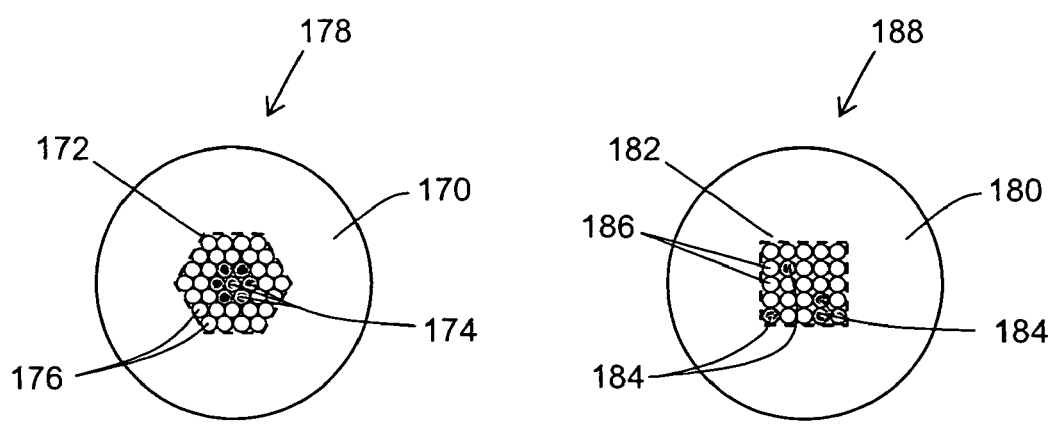
FIG. 11 is a schematic view of methods using optional spacing members to tailor the beam output from the fused fiber bundle according to an embodiment of the present invention.

The optical fibers may be of any desirable type, as described above. The fusible segments of the optical fibers are desirably stripped of any polymer coating to enable close spacing of the terminal segments in the inner bore of the glass tube and to provide an organic-free fused region. The fusible region may be formed near an end segment of the optical fibers, as shown in FIG. 9, or may be formed in an interior segment of the optical fibers 162, as shown in schematic view in FIG. 10. Using an interior segment of the optical fibers as the fusible segment may be advantageous, because separation of the fused section 164 can then yield two fused fiber bundles 168.

The cellular holding structure can be made using the stack-and-draw methods used to make photonic band gap optical fiber preforms. In these methods, glass capillaries are stacked together in parallel, and the resulting assembly is fused together and reduced in cross-sectional area by a glass drawing process. The sizes of the holes in the drawn structure can be increased by etching with a glass etchant. Procedures for making photonic band gap optical fiber preforms are described in detail in U.S. Pat. No. 6,243,522 (issued Jun. 5, 2001); U.S. Pat. No. 6,445,862 (issued Sep. 3, 2002); and U.S. Pat. No. 6,468,374 (issued Oct. 22, 2002); U.S. Pat. No. 6,444,133 (issued Sep. 3, 2002); and U.S. Pat. No. 6,847,771 (issued Jan. 25, 2005); in U.S. patent application Ser. No. 10/171,335 (filed Jun. 12, 2002); Ser. No. 10/232,099 (filed Aug. 29, 2002); Ser. No. 10/298,374 (filed Nov. 18, 2002); Ser. No. 10/448,931 (filed May 29, 2003); Ser. No. 10/815,082 (filed Mar. 31, 2004), each of which is hereby incorporated herein by reference in its entirety. Similarly, glass extrusion techniques, such as those described in U.S. Pat. No. 6,260,388 (issued Jul. 17, 2001), which is hereby incorporated herein by reference may be adapted to form the cellular holding structures of the present invention. Using the teachings of the above-referenced U.S. Patents and patent applications, as well as the knowledge of the art, the skilled artisan can adjust the glass drawing techniques conditions, etching conditions, capillary shapes, and fuse concentric glass tubes together to provide a cellular holding structure having a desired structure.

The optional spacing members can be used by the skilled artisan in combination with the longitudinal cells of the cellular holding structure to define a desired geometry of optical fibers in the fused fiber bundle. For example, as shown in cross-sectional schematic view in FIG. 8, a cellular holding structure 170 having a cellular web structure 172 with a triangular lattice structure can be used in combination with spacing members 174 in the innermost cells to give a hexagonal annular geometrical arrangement of optical fibers 176 in fused fiber bundle 178. Similarly, a cellular holding structure 180 having a cellular web structure 182 having a square lattice structure can be used in combination with a plurality of spacing members 184 to yield a complex geometrical arrangement of optical fibers 186 in fused fiber bundle 188. The use of spacing members in fabricating the fused fiber bundles of the present invention can allow the skilled artisan to form a complex beam to match a desired optical device using a stock cellular holding structure having a relatively simple geometry and lattice type. However, for the sake of simplicity and ease of manufacture, in certain desirable embodiments of the invention no spacing member is used.

Figure 12:
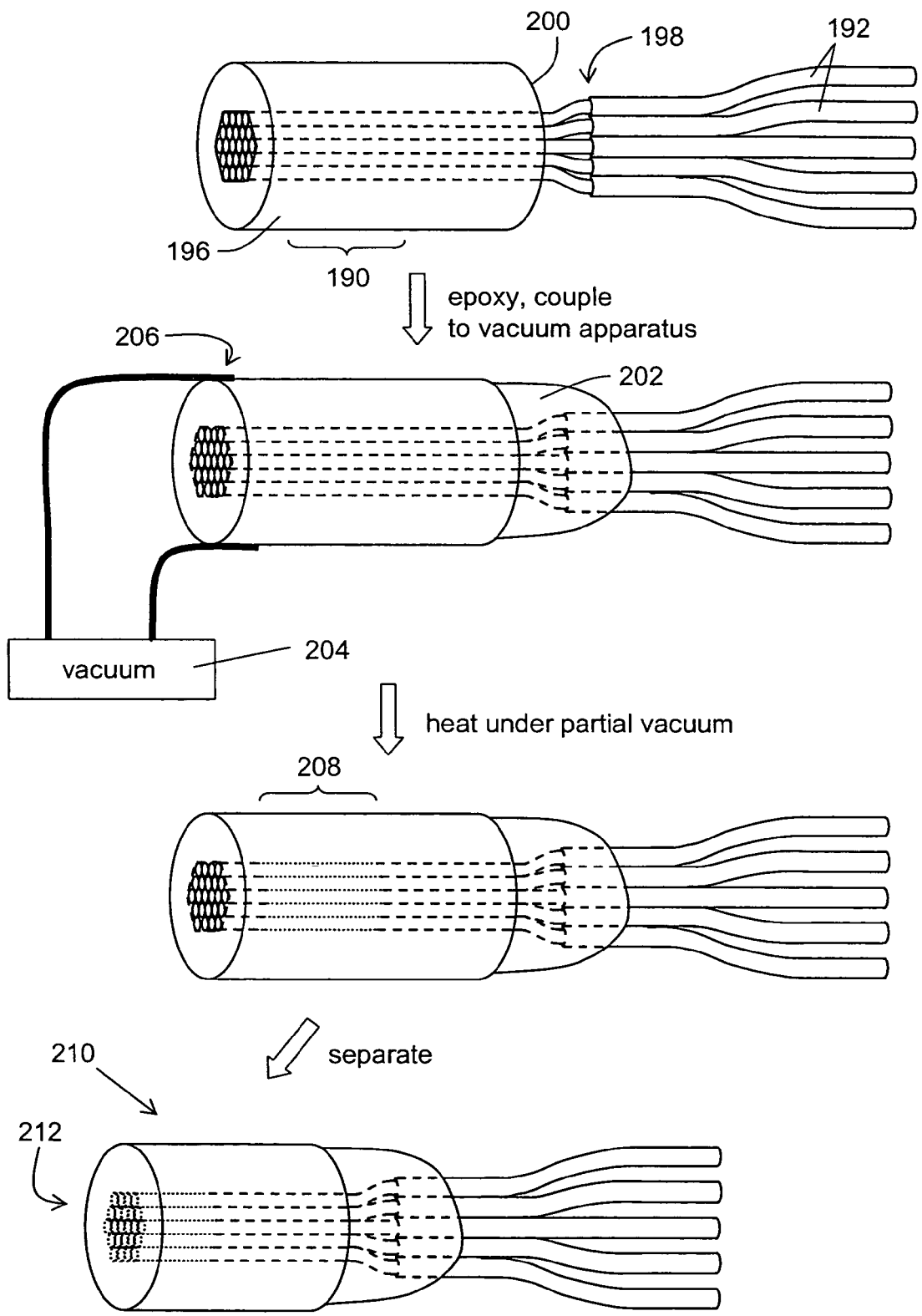
FIG. 12 is a schematic view of a method of heating a glass tube surrounding fusible segments of optical fibers under partial vacuum.

As described above, it may be desirable to remove the airspace among the optical fibers, the optional at least one spacing member, and the web material of the cellular holding structure. In one desirable embodiment of the invention, the step of heating the cellular holding structure is performed under partial vacuum, so that the structure collapses during heating and at least partially removes the airspace among the optical fibers, the optional at least one spacing member, and the web material of the cellular holding structure. In certain desirable embodiments of the invention, the step of heating the cellular holding structure is performed under partial vacuum, so that the structure fully collapses during heating, and substantially no airspace remains among the optical fibers, the optional at least one spacing member, and the web material of the cellular holding structure An example of a method for performing the step of heating of the cellular under partial vacuum is shown in schematic view in FIG. 12. When the fusible segments 190 of optical fibers 192 are inserted into the cellular web portion 194 of cellular holding structure 196, the stripped edges 198 of the optical fibers 192 are brought near the distal end 200 of the cellular holding structure 196. A polymeric material 202 (e.g. an epoxy adhesive) is used to both seal the distal end 200 of cellular holding structure 196, and to provide strain relief to optical fibers 192. A vacuum apparatus 204 is operatively coupled to proximal end 206 of cellular holding structure 196, and a partial vacuum is pulled while the cellular holding structure 196 is heated in the region surrounding the fusible segments 190 of optical fibers 192, thereby forming fused section 208. The skilled artisan can adjust the vacuum and heating conditions to provide partial or full collapse of the fused section of the fused fiber bundle, either partially or substantially removing the airspace among the optical fibers, the optional at least one spacing member, and the web material of the cellular holding structure. For example, as shown in FIG. 12, after heating and separation, fused fiber bundle 210 has substantially no airspace remaining among the optical fibers and the cellular holding structure, as evidenced by the substantially solid glass endface 212.

Figure 13:
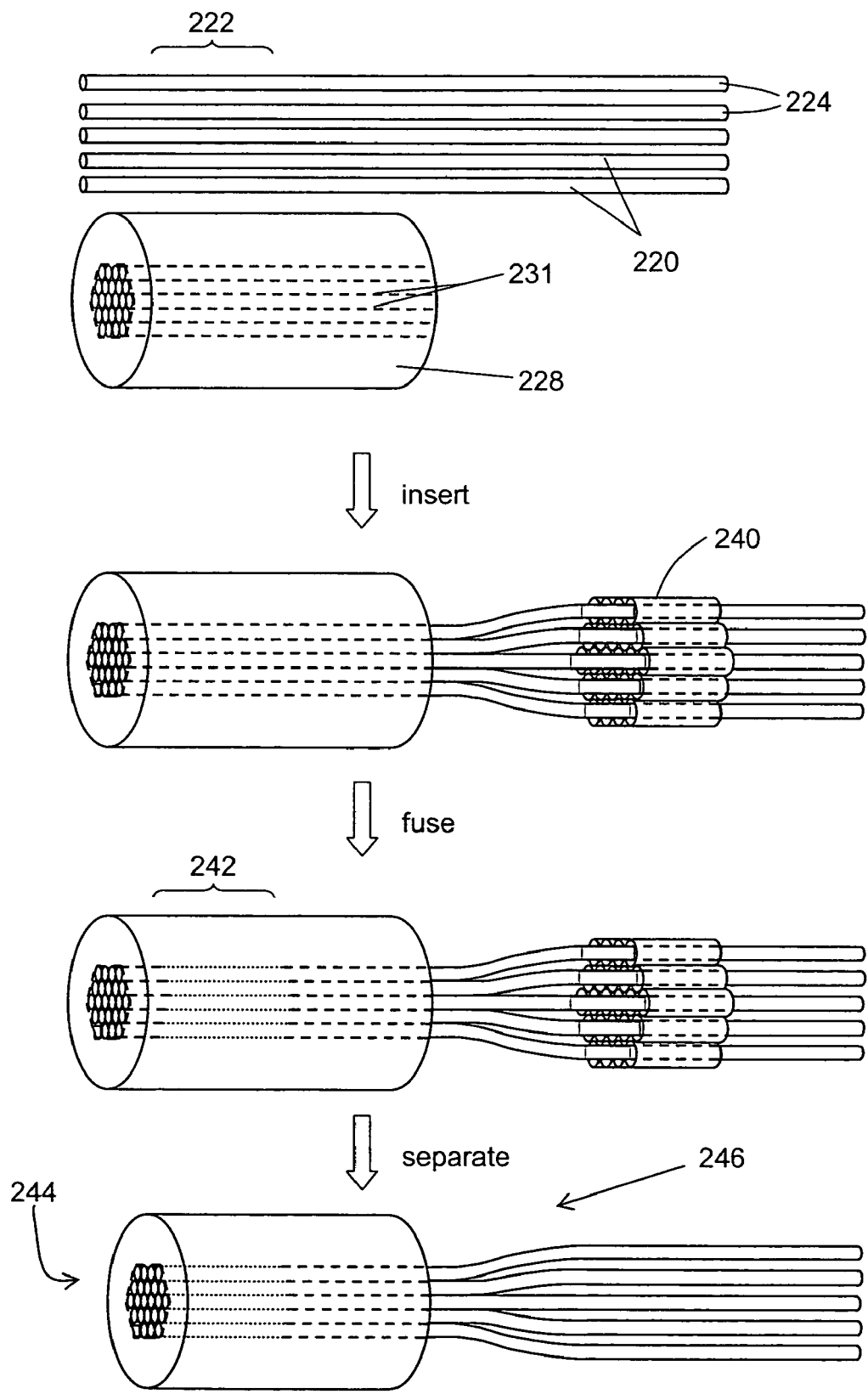
FIG. 13 is a schematic view of a method of making a fiber bundle using a cellular arrangement tool.

As the skilled artisan will appreciate, it can be a difficult task to insert several optical fibers of very small dimension (125 µm stripped diameter) with any optional spacing members into longitudinal cells adapted just to fit the optical fibers in a specified geometrical arrangement. The present invention includes methods to make fiber bundles that include methods for conveniently and precisely inserting optical fibers and optional spacing members into the longitudinal cells of the cellular web structure. For example, a cellular arrangement tool maybe used to simplify the assembly of the fused fiber bundles of the present invention. An embodiment of a method for making a fiber bundle according to the present invention is shown in schematic view in FIG. 13. A plurality of optical fibers 220, each having an fusible segment 222 and a distal end 224; and a cellular holding structure 228 having an tube portion 229 and a cellular web portion 230 are provided. The cellular web portion 230 has a plurality of longitudinal cells 231 arranged in parallel and surrounded by web material, as described above. The cellular web portion 230 is adapted to provide the desired geometrical arrangement to the fusible segments 222 of the optical fibers 220. The fusible segments 222 of optical fibers 220 are inserted through a cellular arrangement tool 240 and into the cells 231 of the cellular holding structure 230 in a substantially parallel arrangement. The cellular holding structure is then heated to cause fusion of the web material to the fusible segments of the optical fibers, as described hereinabove, forming a fused region 242. Fused region 242 is then separated to expose an endface 244, thereby forming the fused fiber bundle 246.

Figure 14:
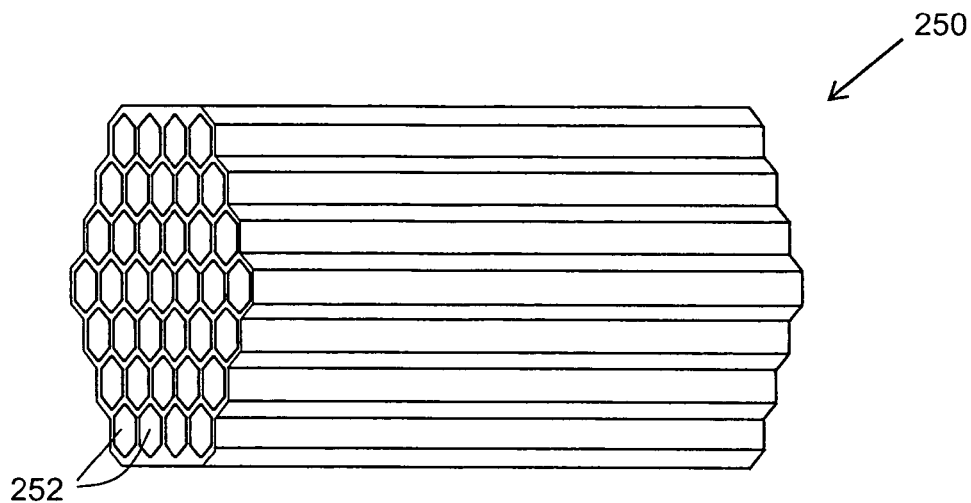
FIGS. 14 and 15 are schematic views of embodiments of cellular arrangement tools according to an embodiment of the present invention.
Figure 15:
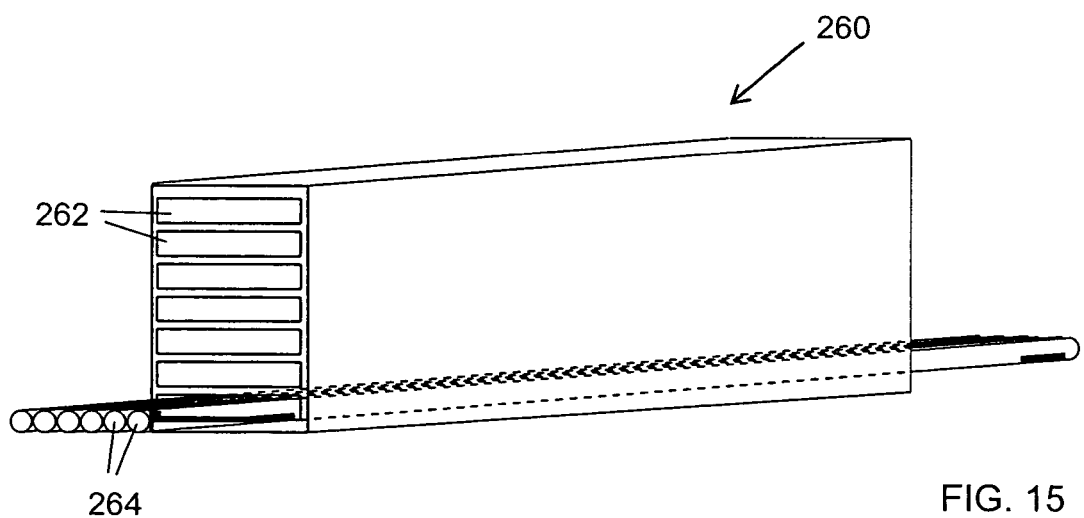

An example of a cellular arrangement tool is shown in FIG. 14. The cellular arrangement tool is adapted to provide the desired spatial arrangement to the plurality of optical fibers in order to ease insertion into the cellular holding structure. The cellular arrangement tool 250 has a plurality of parallel cells 252, each adapted to hold a single optical fiber in a desired arrangement. The cells 252 are desirably large enough to allow the optical fibers to slide freely through them; however, the skilled artisan may use a lubricating fluid such as isopropanol to ease the sliding of the optical fibers through the cellular arrangement tool. In desirable embodiments of the invention, the cells are large enough to fit coated optical fibers, so that much of the optical fibers can remain coated in the fiber bundle. The cellular arrangement tool 250 may be made in a variety of ways. For example, the skilled artisan can construct a cellular arrangement tool from arrayed hypodermic tubing. The cellular arrangement tool can be a cellular glass structure, made for example by adapting the stack-and-draw methods for making photonic band gap optical fibers described in the U.S. Patents and U.S. patent applications referenced above. The cellular arrangement tool of FIG. 14 is configured so that each cell is adapted to fit a single optical fiber; however, the skilled artisan will appreciate that each cell of a cellular alignment tool can be adapted to fit more than one optical fiber. For example, the cellular arrangement tool 260 shown in schematic view in FIG. 15 has cells 262 adapted to fit rows of optical fibers 264. The cells of the cellular arrangement tool can be of any convenient or desirable cross-sectional shape, such as the round cells of cellular arrangement tool 240 of FIG. 13, or the hexagonal cells of cellular arrangement tool 250 of FIG. 14.

Figure 16:
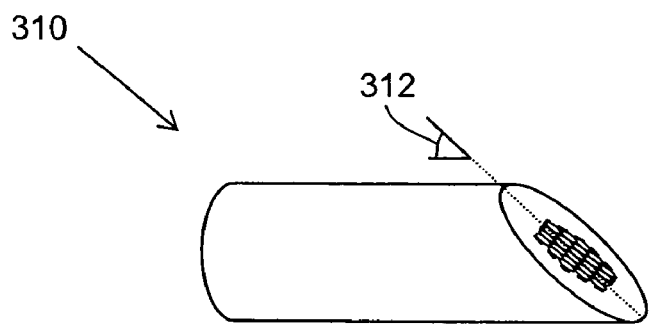
FIG. 16 is a schematic view of a beveled cellular holding structure for use in a method according to one embodiment of the present invention.

In order to ease insertion of the fusible segments of the optical fibers into the longitudinal cells of the cellular holding structure, it may be desirable for the cellular holding structure to be beveled, as shown in FIG. 16. The cellular holding structure 310 desirably has a bevel angle 312 of between about 20° and about 70°. More desirably, the cellular holding structure has a bevel angle between about 30° and about 60°. For example, the cellular holding structure can have a bevel angle of about 45°.

Many embodiments of the present invention include the step of separating a fused or affixed region of a fiber bundle in order to present an endface. The skilled artisan will appreciate that many different methods can be used to effect the separation. For example, a fused or affixed region can be scored and broken, as is familiar in the optical fiber art. Alternatively, a dicing saw, laser machining, or heat can be used to effect the separation. The separation step will desirably include a polishing or grinding step to present a flat endface. The endface can be prepared at a non-perpendicular angle (e.g., 8-10°) and can be AR coated in order to reduce backreflection from the endface, as would be familiar to the skilled artisan.

The fiber bundles of the present invention can be coupled to optical systems in a variety of ways, as would be apparent to the skilled artisan. For example, the endfaces of the fiber bundles of the present invention can be butt-coupled to an optical source or detector, and can be affixed thereto with a suitably transparent adhesive. The endfaces of the fiber bundles of the present invention can be coupled to an optical fiber, for example, by fusion splicing. In many embodiments of the invention (e. g. , where the refractive index of the glass tube is less than that of the claddings of the optical fibers), the endface of a tapered fiber bundle can be fusion spliced to an optical fiber without the use of a polymer overcoating to ensure the confinement of light. The endfaces of the fiber bundles of the present invention can also be operatively coupled to an optical system through free space, using, for example, a lens or a mirror.

Figure 17:
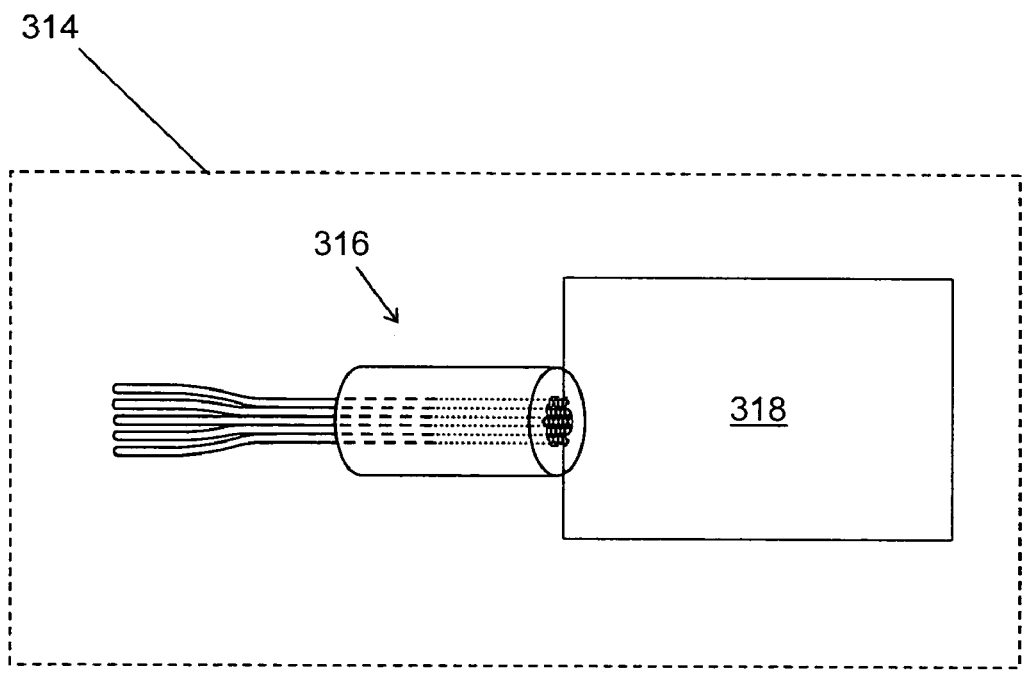
FIG. 17 is a schematic view of an optical system according to an embodiment of the present invention.
Figure 18:
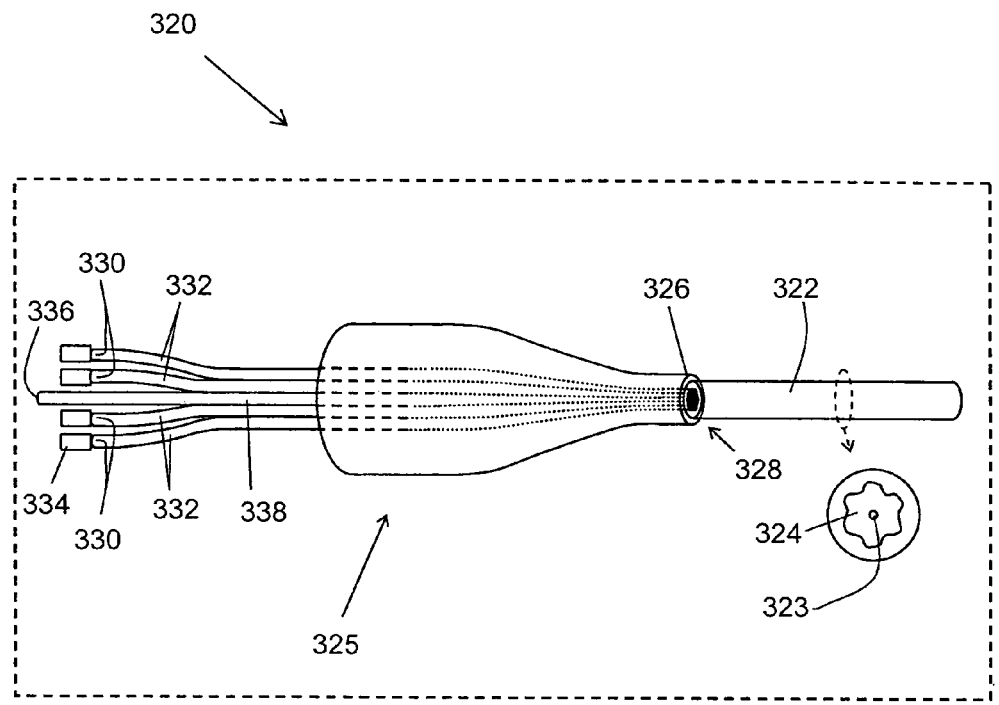
FIG. 18 is a schematic view of a cladding-pumped fiber device according to one embodiment of the present invention.

The fiber bundles of the present invention may be used in a variety of optical systems. As such, one embodiment of the invention, shown in schematic view in FIG. 17, relates to an optical system 314 including a fused fiber bundle 316 substantially as described above operatively coupled to an optical device 318. The fiber bundles of the present invention may be advantageously used in devices using cladding-pumped fiber, such as cladding-pumped fiber amplifiers and cladding-pumped fiber lasers. In such devices, a fiber bundle substantially as described above is operatively coupled to a cladding-pumped fiber. For example, according to one embodiment of the invention, shown in a not-to-scale schematic view in FIG. 18, a cladding-pumped fiber device 320 includes a cladding-pumped fiber 322, and a fiber bundle 325. Cladding-pumped fiber 322 has a core 323 and an inner cladding 324, shown in cross-sectional view in the inset of FIG. 18. The fiber bundle can be any fiber bundle of the present invention as described hereinabove, but is desirably a fused fiber bundle. Desirably, the fiber bundle has a glass tube which has a refractive index less than the refractive index of the claddings of its optical fibers. The distal ends 330 of some of the optical fibers 332 of the fiber bundle may be coupled, for example, to optical sources 334 (e.g., semiconductor lasers), as shown in FIG. 18. The distal end 336 of the central optical fiber 338 of the fiber bundle may be a single mode optical fiber, and may be coupled to a source of an optical signal. The endface 326 of the fiber bundle 325 is coupled (e.g., by fusion splicing) to an end 328 of the cladding-pumped fiber. In the embodiment of FIG. 18, the central optical fiber 338 is coupled to the core 323 of the cladding-pumped fiber 320 through the endface of the fiber bundle, and the optical fibers 332 are coupled to the inner cladding 324 of the cladding-pumped fiber through the endface 326. Desirably, fiber bundle has substantially no organic material between neighboring optical fibers and between the optical fibers and the thick-walled tube, allowing the cladding-pumped fiber device to operate at relatively higher power. Cladding-pumped fiber devices are described in more detail in U.S. Pat. No. 5,864,644, which is hereby incorporated herein by reference in its entirety.

Figure 19:
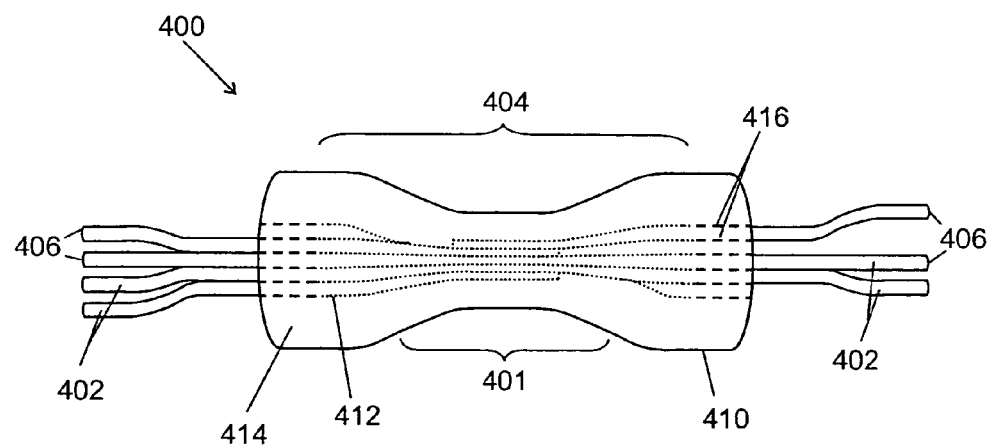
FIG. 19 is a schematic side view of an optical fiber coupler according to an embodiment of the present invention.

Another embodiment of the invention relates to an optical fiber coupler, as shown in schematic view in FIG. 19. Optical fiber coupler 400 has a fused, tapered section 401. The optical fiber coupler 400 includes a plurality of optical fibers 402, each having a fused segment 404 and at least one distal end 406. Optical fiber coupler 400 also includes a cellular holding structure 410 having a tube portion 414 surrounding a cellular web portion 412 having a plurality of longitudinal cells 416 arranged in parallel and surrounded by web material, as described above. The fused segments 404 of the optical fibers are disposed within the longitudinal cells 416 in the fused, tapered section of the optical fiber coupler, and are substantially fused to the web material. Each optical fiber is optically coupled to at least one other optical fiber in the fused, tapered section of the optical fiber coupler. In the general embodiment of FIG. 19, some optical fibers have two distal ends, one on either side of the device; while others have only a single distal end, with the other end of the optical fiber being buried within the coupler. In order to produce couplers having the desired coupling characteristics, the skilled artisan can use the techniques described hereinabove in conjunction with standard techniques for making overclad couplers, such as those described in U.S. Pat. Nos. 4,902,324; 5,009,692; 5,011,251; 5,017,206; 5,251,276; 5,295,205; 5,339,372; 5,351,326; 5,881,189;

5,889,908; 5,956,443; and 6,092,394, each of which is hereby incorporated by reference in its entirety. The skilled artisan will recognize that it will be desirable to use cellular holding structures having relatively thin web material, as well as a web material that has a refractive index similar to that of the claddings of the optical fibers.

The skilled artisan can make a wide variety of optical fiber couplers according to the present invention. For example, according to one embodiment of the present invention, the optical fiber coupler is an N×N coupler, wherein optical fiber has a first distal end and a second distal end, with the fused region of the optical fiber being disposed between the first distal end and the second distal end, and wherein the first distal end and second distal end of each fiber. According to another embodiment of the invention, the optical fibers are polarization maintaining optical fibers, and exhibit substantially no twist with respect to each other in the fused, tapered region of the coupler, because of the structural integrity provided by the cellular holding structure. According to another embodiment of the invention, the optical fiber coupler is an 1×M coupler, with a single optical fiber entering one end of the cellular alignment structure, and M optical fibers inserted through the other end of the cellular alignment structure.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fused fiber bundle having a terminal section ending with an endface, the fused fiber bundle comprising:
   a plurality of optical fibers, each of the optical fibers having a terminal segment ending with a proximal end, and a distal end; and
   a cellular holding structure, the cellular holding structure including a cellular web portion having a plurality of longitudinal cells arranged substantially in parallel and surrounded by a web material; and a tube portion surrounding the cellular web portion;
   wherein at the endface, the ratio of the cross-sectional area of the endface to the cross-sectional area of the cellular web portion is at least about 2.5;
   wherein the terminal segments of the optical fibers are arranged substantially in parallel, and
   wherein the terminal segment of each optical fiber is disposed in a longitudinal cell of the cellular holding structure and substantially fused to the web material, thereby forming the terminal section of the fused fiber bundle.

2. The fused fiber bundle of claim 1, wherein the plurality of optical fibers comprises at least 4 optical fibers.

3. The fused fiber bundle of claim 1, wherein the terminal section of the fused fiber bundle has substantially no organic material between the terminal sections of the optical fibers and the web material.

4. The fused fiber bundle of claim 1, wherein the minimum thickness of the web material is less than about 100 µm.

5. The fused fiber bundle of claim 1, wherein the optical fibers each include a core and a cladding, and wherein the refractive index of the tube portion of the cellular holding structure is less than the refractive index of the claddings of the optical fibers.

6. The fused fiber bundle of claim 1, wherein the optical fibers each include a core and a cladding, and wherein the refractive index of the web material of the cellular holding structure is less than the refractive index of the claddings of the optical fibers.

7. The fused fiber bundle of claim 1, wherein the terminal section of the fused fiber bundle is collapsed so that substantially no airspace remains between the terminal sections of the optical fibers and the web material.

8. The fused fiber bundle of claim 1, wherein the optical fibers each include a core and a cladding, and wherein the coefficient of thermal expansion of the cladding of the optical fibers is within about 30% of the coefficient of thermal expansion of the web material and of the tube portion of the cellular holding structure.

9. The fused fiber bundle of claim 1, wherein the optical fibers each include a core and a cladding, and wherein the softening point of the web material is at least 50 K less than the softening point of the material forming the cladding of the optical fibers.

10. The fused fiber bundle of claim 1, wherein the optical fibers each include a core and a cladding, and wherein the softening point of the tube portion of the cellular holding structure is at least 50 K less than the softening point of the claddings of the optical fibers.

11. The fused fiber bundle of claim 1, wherein the terminal section of the fused fiber bundle ends in a taper of reduced cross-section.

12. The fused fiber bundle of claim 1, wherein the endface of the fused fiber bundle is greater than 0.78 mm$^2$ in cross-sectional area.

13. The fused fiber bundle of claim 1, wherein the optical fibers are multimode optical fibers.

14. An optical system comprising the fused fiber bundle of claim 1 operatively coupled to an optical device.

15. A method of making a fused fiber bundle having a terminal section ending with an endface comprising the steps of:
   providing a plurality of optical fibers, each of the optical fibers having a fusible segment and a distal end;
   optionally providing at least one spacing member;
   providing a cellular holding structure, the cellular holding structure having a cellular web portion having a plurality of longitudinal cells arranged in parallel and surrounded by web material; and a tube portion surrounding the cellular web portion; wherein at the endface, the ratio of the cross-sectional area of the endface to the cross-sectional area of the cellular web portion of the cellular holding structure is at least about 2.5;
   inserting the fusible segments of the optical fibers and the optional at least one spacing member into the longitudinal cells of the cellular holding structure in a substantially parallel arrangement;
   heating the cellular holding structure in the region surrounding the fusible segments of the optical fibers, so that the optical fibers substantially fuse to the web material of the cellular holding structure, thereby forming a fused region; and
   cutting the fused region to expose an endface, thereby forming the fused fiber bundle.

16. The method of claim 15, wherein the step of heating the cellular holding structure is performed under partial vacuum, and at least partially removes any airspace between the optical fibers and the web material of the cellular holding structure in the fused region.

17. The method of claim 15, wherein the step of heating the cellular holding structure removes substantially all of the airspace between the optical fibers and the web material of the cellular holding structure in the fused region.

18. The method of claim 15, further comprising, before the step of inserting the fusible segments of the optical fibers into the longitudinal cells of the cellular holding structure, the step of inserting the fusible segments of the optical fibers into an cellular arrangement tool; and wherein in the step of inserting the fusible segments of the optical fibers into the longitudinal cells of the cellular holding structure, the optical fibers are pushed through the cellular arrangement tool.

19. An optical fiber coupler having a fused, tapered section, the optical fiber coupler comprising
a plurality of optical fibers, each optical fiber having a fused segment and at least one distal end;
a cellular holding structure, the cellular holding structure having a cellular web portion having a plurality of longitudinal cells arranged in parallel and surrounded by web material; and a tube portion surrounding the cellular web portion;
wherein at an endface of the cellular holding structure, the ratio of the cross-sectional area of the endface to the cross-sectional area of the cellular web portion is at least about 2.5;
wherein the fused segments of the optical fibers are disposed within the longitudinal cells of the cellular holding structure in the fused, tapered section, and
wherein in the fused, tapered section of the optical fiber coupler, the fused segment of each optical fiber is fused to the web material and is optically coupled to at least one other optical fiber.

20. The optical fiber coupler of claim 19, wherein the optical fiber coupler is an N×N optical fiber coupler, and
wherein each optical fiber has a first distal end and a second distal end, with the fused region of the optical fiber being disposed between the first distal end and the second distal end, and wherein the first distal end and second distal end of each fiber.

21. The optical fiber coupler of claim 19, wherein the optical fibers are polarization maintaining optical fibers, and wherein the optical fibers exhibit substantially no twist with respect to each other in the fused region of the coupler.

22. The optical fiber coupler of claim 19, wherein the optical fiber coupler is a 1×M optical fiber coupler.

* * * * *